Nov. 29, 1960    A. L. BORENSTEIN    2,962,647
LIGHT SENSITIVE MOTOR CONTROL
Filed April 16, 1956    4 Sheets-Sheet 3
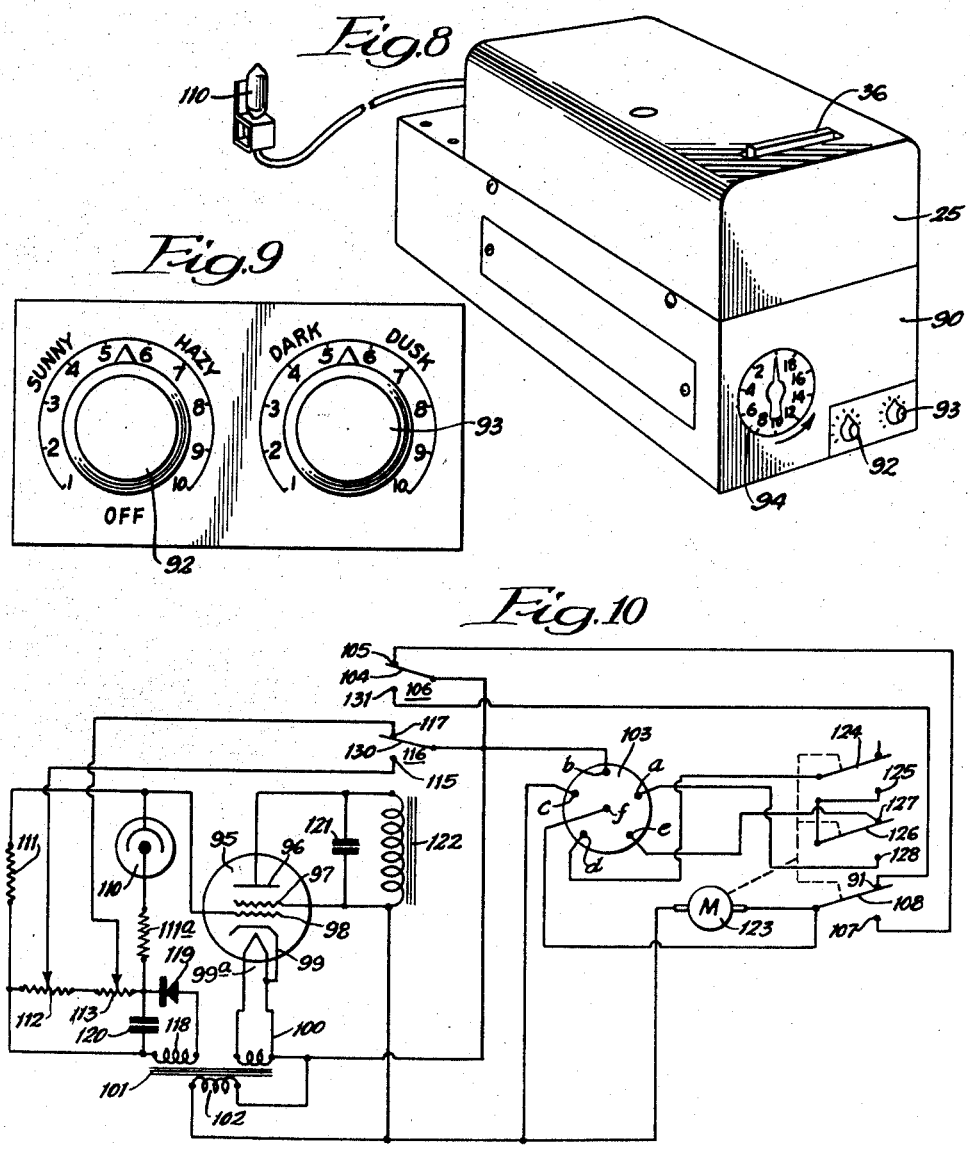
INVENTOR:
Arnold L. Borenstein,
BY
Bair, Freeman & Molinare
ATTORNEYS.

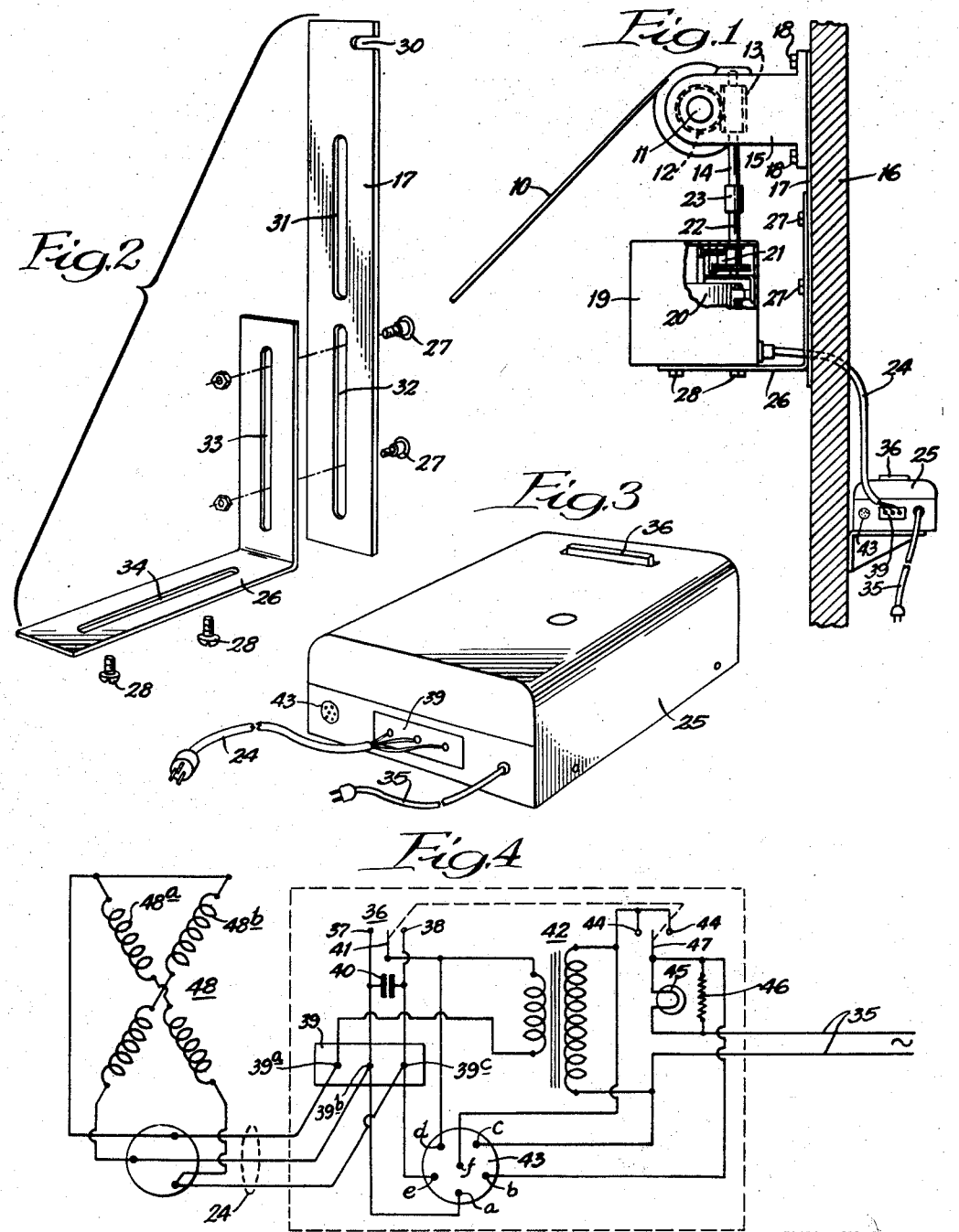

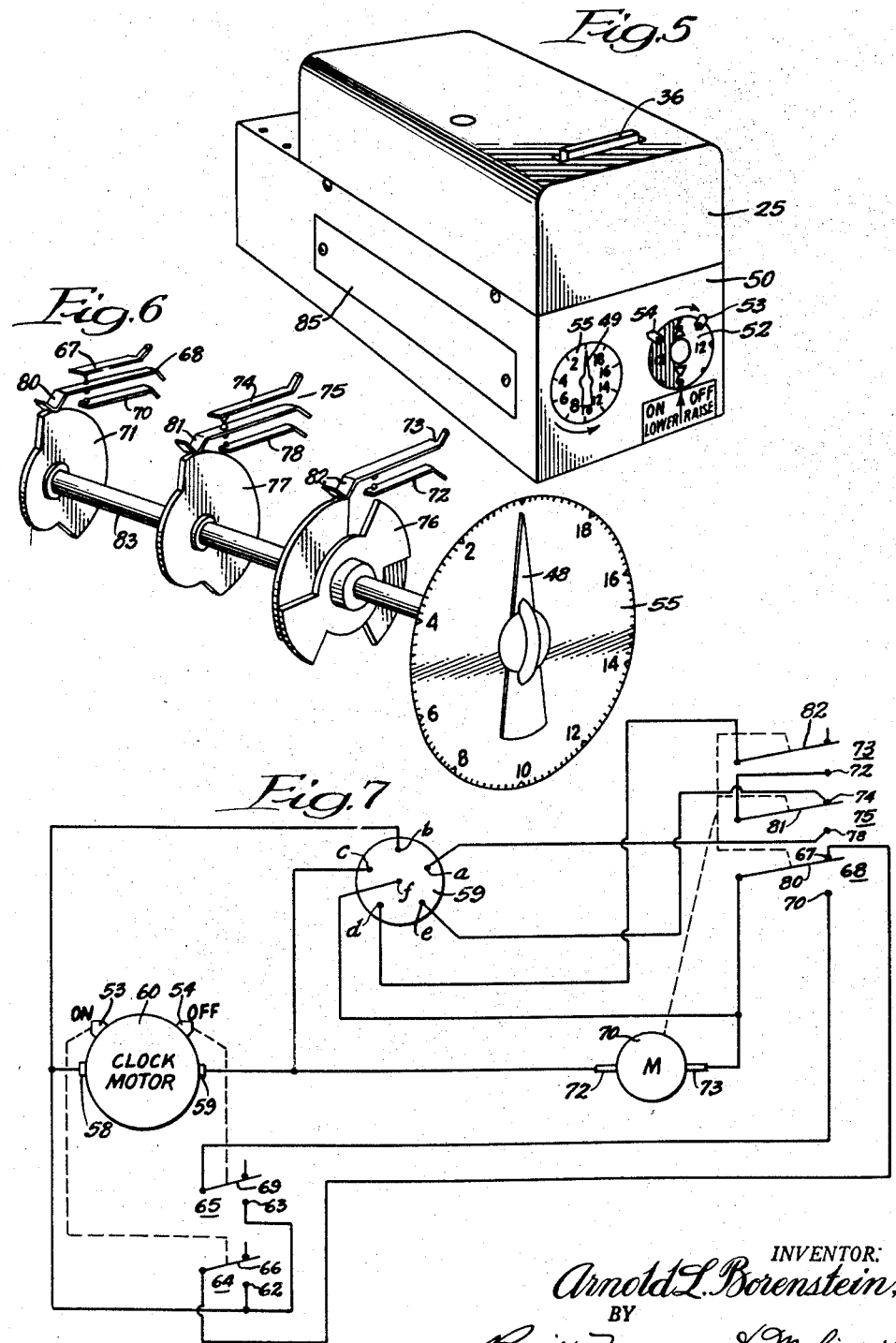

Nov. 29, 1960  A. L. BORENSTEIN  2,962,647
LIGHT SENSITIVE MOTOR CONTROL
Filed April 16, 1956  4 Sheets-Sheet 4
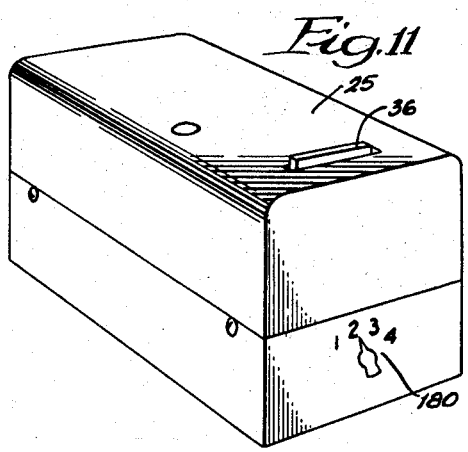
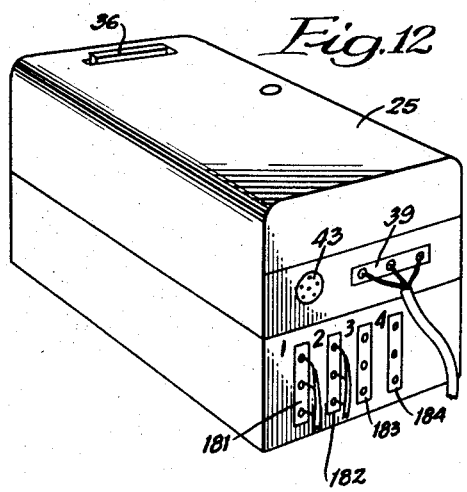
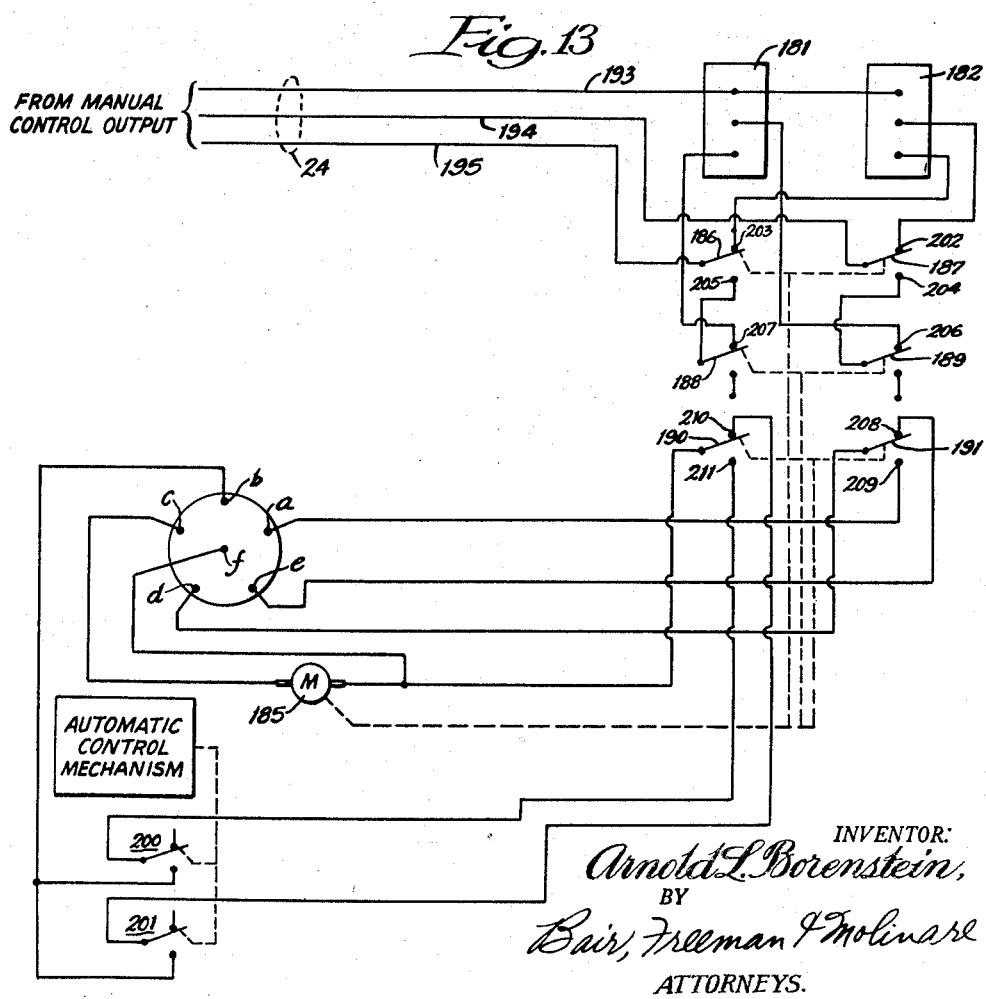
INVENTOR:
Arnold L. Borenstein,
BY
Bair, Freeman & Molinare
ATTORNEYS.

United States Patent Office 2,962,647
Patented Nov. 29, 1960

2,962,647

LIGHT SENSITIVE MOTOR CONTROL

Arnold L. Borenstein, 2619 W. Division St., Chicago, Ill.

Filed Apr. 16, 1956, Ser. No. 578,320

2 Claims. (Cl. 318—480)

This invention relates generally to automatic control systems, and more particularly to such systems for controlling the excursion of a movable object between a plurality of limiting positions in response to the occurrence of various predetermined conditions.

It is known to provide a movable device with electrically operated remote control means for causing the device to travel in a desired direction between two limiting positions. Such systems may be utilized, for example, with awnings, shades, jalousies and the like, of the type mounted on the outside of a building or structure to the end that the awning apparatus may be selectively raised or lowered by an operator within the building at a position remote from the awning.

Manifestly, in such systems it is advantageous to provide the remote control means for operating the awning with additional controls for automatically determining the raising and lowering movement of the awning in accordance with a number of predetermined conditions and thereby eliminate the necessity for human intervention. Thus, it is desirable in many applications, to provide awning control means for automatically lowering an awning to its lower limiting position at a given time each day and for automatically raising the awning to its upper limiting position at a different given time each day. Further, it is desirable in other applications to automatically raise and lower an awning in accordance with light intensity such that for a given amount of light the awning will be lowered and for a given darkness level the awning will be raised. Obviously, in uses of awnings with business establishments as well as residential buildings, such automatic systems serve to protect the appearance and useful life of articles of the type which may be damaged by excessive sunlight.

Further, it is desirable that such automatic systems be relatively inexpensive in construction as well as operation. In addition to the above, these automatic systems advantageously should be compact and adapted for installation and use with presently existing awning structures.

Therefore, it is a general object of this invention to provide improved means for automatically controlling an electrically operated awning apparatus or the like.

It is another object of this invention to provide an improved awning control means adapted to raise and lower an awning as desired in response to the occurrence of predetermined conditions.

It is a further object of this invention to provide automatic control means for operating an awning apparatus at predetermined time intervals.

It is a still further object of this invention to provide automatic means for selectively controlling the operation of desired ones of a plurality of awnings.

It is a still further object of this invention to provide an improved remote control device for automatically determining the degree and direction of travel of an awning apparatus in accordance with certain predetermined conditions which is relatively inexpensive to construct and operate and which is adaptable to existing awning structures.

With these and other objects in view, the invention consists in the construction, arrangement and combination of the various parts of the novel automatic awning system whereby the objects contemplated are attained as hereinafter more fully set forth. The various features of novelty which characterize this invention are pointed out with particularity in the claims annexed to and forming a part of this specification. For a better understanding of the invention, however, and its advantages, reference is had to the accompanying drawing and descriptive matter in which is illustrated and described a specific illustrative embodiment of the invention.

In the drawing:

Figure 1 is a side elevational view partly in cross section through the supporting wall of an electrically operated awning apparatus of the type with which the present invention may be utilized;

Figure 2 is a perspective view of the mounting brackets for the awning apparatus in accordance with the invention;

Figure 3 is a perspective view showing the exterior of the motor control unit for the awning apparatus;

Figure 4 is a schematic diagram of the motor control circuit and motor windings of the awning apparatus;

Figure 5 is a perspective view showing the exterior of the automatic timing unit and motor control assembly;

Figure 6 is a perspective view showing the cam switching assembly of the automatic timing unit;

Figure 7 is a schematic diagram of the electrical circuit of the automatic timing unit;

Figure 8 is a perspective view showing the exterior of the automatic light control unit and motor control assembly, including a light sensitive element;

Figure 9 is an elevational view on an enlarged scale of the light intensity dial-set means for the automatic light control unit of Figure 8;

Figure 10 is a schematic diagram of the electrical circuit of the light control unit;

Figure 11 is a front perspective view showing the exterior of a multiple switching and motor control assembly for a plurality of awnings;

Figure 12 is a rear perspective view of the assembly of Figure 11; and

Figure 13 is a schematic diagram of the electrical circuit of an automatic multiple switching assembly.

Referring now more particularly to the drawing, there is shown in Figure 1 a conventional awning 10 having a movably mounted frame including a roller 11. One end of the roller has a spur gear 12 connected thereto which is engaged by a worm gear 13 supported by shaft 14. Roller 11, spur gear 12 and worm gear 13 are supportingly mounted in housing 15 which is rigidly secured to the supporting wall 16 by means of bolts 18, as described in greater detail below.

The awning motor unit 19 is rigidly secured to wall 16 by means of right angle bracket 26, bolts 27 and 28, straight bracket 17 and bolts 18, and includes an electric motor 20, the rotor of which is coupled through a suitable gear arrangement 21, drive shaft 22 and flexible coupling 23 to upper shaft 14. As seen in Figure 1, the electric motor 20 is energized by suitable electrical wiring 24 disposed through supporting wall 16 and connected to a motor control unit 25 located within the interior of the building.

Figure 2 shows the details of the bracket mounting members. The straight bracket 17 comprises a flat, rectangular member having a notch 30 in one side thereof near the top of the member and a pair of elongated slots 31 and 32 disposed near the center of the bracket. The right angle bracket 26 comprises an elongated slot 33 in one leg thereof and an elongated slot 34 in the other leg thereof. Advantageously, straight bracket 17 is secured to the exterior of mounting wall 16 and the awning housing 15 is fastened thereto. The lower elongated slot 32 in bracket 17 is fastened to right angle bracket 26 such that the awning motor unit 19 may be mounted thereon and secured thereto by bolts 28 disposed through slot 34. It is a feature of the invention that the mounting brackets embodied in Figure 2 permit both shock absorption in the event of motor stall and a simple means for mounting the motor unit with existing awning apparatus.

Although for purposes of illustration a particular movable awning apparatus has been disclosed, it will be understood that the power drive and control units of the invention may be adapted for use with other types of awning installations and the like. Also, suitable gearing may be employed to obtain any desired gear ratio for effecting rotation of the awning roller at a desired predetermined speed.

The motor control mechanism is incorporated within a housing 25 located within the interior of the building. As shown in Figure 3 of the drawing, the housing comprises at its exterior a terminal plate 39 for an electrical cable 24 to enable connection with the motor unit 19, a power cord 35 for connection to a source of power, a switch 36 disposed on the top of the housing for controlling the energization and direction of travel of the awning apparatus and a socket 43 for connection to accessory automatic controls.

Figure 4 of the drawing shows the schematic diagram of the electrical control circuits within the housing. For a more detailed description of this circuit, reference is had to an application of Joseph J. Cohn, Serial No. 448,527, filed August 9, 1954, now Patent No. 2,789,263, granted April 16, 1957. Briefly, the circuit comprises the field coils of the motor, shown generally as 48, which coils are connected through the electrical cable 24 to a terminal panel 39 within the motor control housing. A manual switch 36 of the momentary contact double-pole, double-throw type, has a raised contact 37 and a lower contact 38 thereon connected to terminals 39b and 39c, respectively, on terminal panel 39. A condenser 40 is connected between these two terminals. The movable contact 41 of switch 36 is connected through the secondary windings of transformer 42 to a terminal 39a of the terminal panel 39. The primary windings of transformer 42 are connected at one end thereof to terminal pin f of terminal socket 43 and power contacts 44 and at the other end thereof to one side of the power line. The other side of the power line is connected through a circuit comprising the parallel combination of a lamp 45 and a resistance 46 to the movable contact 47, which advantageously ganged with contact 41 of switch 36.

In the operation of my awning apparatus, the momentary contact switch 36 normally is centered in the conventional manner by suitable spring biasing means to a neutral or open position. Assuming that it is desirable to elevate the awning, switch 36 may be manually thrown and held by the operator in the position. It is apparent from the schematic diagram of Figure 4 that closing the switch 36 to the raised position serves to complete a power circuit from one side of the secondary windings of transformer 42 through capacitor 40 and the terminal 39c to coil 48a of the motor field winding 48 and back through the common terminal 39a to the other side of transformer 42. At the same time a circuit is completed from contact 37 through terminal 39b, field coil 48b and common terminal 39a back to the transformer 42. At the same time, a current supply circuit through a signal lamp 45, contacts 44 and 47, and the primary windings of transformer 42 is completed, thereby providing power to the secondary windings.

It will be appreciated by those versed in the art that the direction of rotation of the motor 20 is readily reversed by throwing the switch 36 to one position or the other, thereby placing capacitor 40 in series with one or the other of the coils of the motor field windings 48. In this way, capacitance 40 is employed to effect a phase difference between the current to the coils of the motor windings. The motor 20 thereby is rotated in a desired direction and is readily reversed by closing the switch 36 in a corresponding direction.

It will be apparent that as the motor rotates the worm gear 13 drives the spur gear 12 and thereby effects rotation of the awning roller shaft 11. The direction of the rotation of the roller shaft, and therefore the elevating or lowering of awning 10, is determined by the direction of rotation of motor 20 which in turn is controlled in the manner described by switch 36.

In accordance with features of this invention, the motor control unit is adapted by means of terminal socket 43 to enable the awning motor to be automatically controlled by an external source such as a time clock or a light responsive photoelectric unit. The time clock embodiment as shown in Figures 5, 6 and 7 of the drawing has a time clock dial which is continuously rotated and has two adjustable tabs on its outer edge. When the On tab strikes a special switch, a cam drive motor starts rotating a plurality of cams to operate switches associated therewith. Two of the cams are fixed and a third cam is adjustable so that its switch can be set to supply power to the awning motor for only the period of time needed to lower the awning to the desired position. When the awning is down the cam drive motor stops and the awning remains down until the Off tab on the time clock dial strikes another special switch to again energize the cam drive motor. At the time the cams are rotated to energize the awning motor and raise the awning to its upper limiting position. In this manner the awning may be automatically operated at preset times each day and thereby do away with the need for human supervision and operation.

The time clock control apparatus is shown in Figure 5 of the drawing and comprises the motor control housing 25 and the clock control housing 50 adapted to be interconnected therewith so as to form an attractive and compact integral unit. Positioned on an end wall of the time clock housing 50 is a dial 52 connected to the clock motor and rotated thereby so as to make one revolution for each twenty-four-hour time period. Fastened to dial 52 is an On tab 53 and an Off tab 54. In accordance with an aspect of this invention, dial 52 is marked with divisions of 24-hour units and switch tabs 53 and 54 are selectively fastened to desired points on the dial in correspondence with the times at which it is desired to have the awning lowered and subsequently raised. Thus, as the dial rotates tab 53 operates switch 64 to initiate the awning lowering action at the desired time. Subsequently, tab 54 operates the switch to initiate the awning raising action at a desired time.

A dial 55 also is positioned on the end wall of the time clock housing 50 and is advantageously divided into 20 units. As shown in Figure 6, a rotatable pointer 49 positioned on the face of the dial 55 is connected to a shaft 83 adapted to be operated by a drive motor 70 (not shown). A plurality of cams 71, 77 and 76 adapted to open and close timing switches 68, 75, and 73 respectively, to thereby control the awning motor operation also are positioned upon and operably rotated by shaft 83, as explained further below.

Figure 7 of the drawings shows the electric circuit of the time clock unit. Clock motor 60 has terminal 59 thereof connected to terminal 72 of cam drive motor 70 and terminal 58 thereof connected to terminal b of terminal plug 59. Terminal 58 of clock motor 60 also is connected to the contacts 62 and 63 of the tab switches 64 and 65, respectively. Movable contact 66 of switching means 64 is adapted to be operated by the On tab 53, and is connected to contact 67 of cam switch 68.

Armature 80 of cam switch 68 is connected to terminal 73 of the drive motor 70 and terminal $f$ of terminal plug 59. Movable contact 69 of tab switch 65 is adapted to be operated by Off tab 54 and is connected to contact 79 of cam switch 68.

Terminal 72 of the cam drive motor 70 is connected to the terminal $c$ of the terminal plug 59. Terminal $d$ of terminal plug 59 is connected to armature 82 of cam switch 73. Terminal $e$ of terminal plug 59 is connected to contact 74 of cam switch 75. Terminal 72 of cam switch 73 and armature 81 of cam switch 75 are electrically connected together. Armatures 82, 81 and 80 of cam switches 73, 75 and 68 are operated by the driven cams 76, 77 and 71, respectively. Terminal $a$ of terminal plug 59 is connected to contact 78 of cam switch 75.

In operation of the device when the On tab 53 of timer motor 60 strikes movable contact 66 of switch 64 to thereby close a circuit between the power source in the motor control unit, the power being applied over terminals $b$ and $c$ of terminal plug 59, and drive motor 70, the latter begins to rotate and drives cams 76, 77 and 71 on shaft 83 in clockwise direction. Cams 76, 77 and 71 in accordance with their particular physical construction serve to operate switches 73, 75 and 68 to provide the desired awning drive function. Thus, switch 68 is operated by cam 71 in such a manner that the cam shaft 83 stops after one-half of the cycle is completed, that is, when contacts 67 and 80 of switch 68 are opened by virtue of armature finger 80 dropping into the cut away segment of cam 71. Cam switch 75 is operated by cam 77 during this one-half cycle of operation such that power is applied to the awning motor windings 48 from the power source through terminal $e$ of terminal plug 59 to drive the awning in the desired direction. Switch 73, which has an adjustable cam 76 operably connected thereto, supplies power to the awning motor for the necessary period of time, that is, until the awning reaches its lower limiting position.

This time period is determined when the automatic control apparatus of the invention first is installed with the awning. The time required for the awning to be lowered is measured and the two segments comprising adjustable friction cam 76 are adjusted such that the slots provided therebetween permit the switch armature to drop and close contacts 72 and 82 for the measured period of time. Obviously, the larger the slot, the longer the motor runs. Access for adjustable cam 73 is provided by means of a removable panel 85 in the side wall of the automatic control housing 48.

When contacts 67 and 80 of switch 68 are opened by cam 71 after one-half cycle, the drive motor 70 consequently is de-energized. The unit then remains idle until Off-tab 54 on the clock motor 60 closes contacts 69 and 63 of switch 65 to once again energize the drive motor 70 and cause the system to go through the awning raising half cycle of operation.

The photoelectric control unit is shown in Figure 8 of the drawings.

This unit is designed to automatically lower and raise the awnings in accordance with light intensity. Advantageously, the photoelectric light sensitive device is placed in a window, such as that of a store, and is electrically connected to an electronic control circuit in the control housing. When sunlight strikes the photoelectric tube so as to exceed a preset light level, a cam drive motor is energized and starts to rotate switch operating cams in the manner described above in relation to the time clock embodiment. When the awning is down, the cam drive motor stops and the awning remains at rest until a preset darkness level is detected by the photoelectric tube. At this time the electronic circuit causes the cam drive motor to be energized once again to enable power to be supplied to the awning motor, until the awning is raised.

The photoelectric unit comprises the motor control unit housing 25 which forms an integral assembly with the photoelectric control unit 90, and a photoelectric cell 110. The photoelectric control unit has at one end thereof adjustable dial control 92 for presetting the light intensity necessary to cause the awning to be lowered and a further dial control 93 for presetting the darkness level necessary to cause the awning to be raised. Also positioned on the end wall of unit 90 is a cam switching control dial 94 which corresponds in function to the dial 55 of the time clock unit of Figure 5.

Figure 9 is an enlarged view of the light and darkness level controls and shows how any given level of light intensity may be selected by dial pointers 92 and 93 for desired control of awning lowering and raising operations.

Figure 10 shows the details of the electrical control circuit for the photoelectric unit. The electron discharge device 95 comprises an anode 96, a screen grid 97, a control grid 98, a cathode 99, and a heating filament 99$a$. Electron discharge device 95 is energized by a filament winding 100 of transformer 101 which receives power from a circuit including the primary winding 102, terminal $c$ of terminal plug 103 and terminal $b$ of terminal plug 103. Control electrode 98 of the electron discharge device is connected to photoelectric tube 110 which has connected thereacross a resistance 111 and 111$a$ in series with a pair of potentiometers 112 and 113. The adjustable tap of potentiometer 112 is connected to contact 115 of switch 116. The adjustable tap of potentiometer 113 is connected to contact 117 of switch 116. Potentiometers 113 and 112 correspond to the light and darkness level controls 92 and 93, respectively, shown in Figures 8 and 9. Power for phototube 110 and bias potential for discharge device 95 is obtained from a half-wave rectifier which comprises secondary winding 118 of transformer 101, diode 119 and capacitance 120, connected in parallel with potentiometers 112 and 113.

Anode 96 of electron discharge device 95 is connected through a parallel combination of capacitance 121 and the windings of relay 122 to screen grid 97 and to terminal $c$ of the terminal plug 103. The cam drive motor 123 has one terminal thereof connected to terminal $c$ of terminal plug 103 and the other terminal thereof connected to terminal $f$ of terminal plug 103.

Cam switch armature 124 is connected to terminal $d$ of terminal plug 103. Cam switch contact 125 is connected to cam switch armature 126. Cam switch contacts 127 and 128 are connected to terminals $e$ and $a$ respectively of terminal plus 103. Cam switch contacts 107 and 91 are connected to contacts 105 and 131, respectively, of relay switch 106; armature 104 of switch 106 in connected together with armature 130 of relay switch 116 to terminal $b$ of terminal plug 103. Cam switch armature 108 is connected to terminal pin $f$ of terminal plug 103.

In the operation of the photoelectric embodiment of the instant invention, when the unit is turned on by an On-Off switch, which advantageously may be incorporated as part of the potentiometer 113 in a manner well known in the art, photoelectric cell 110 and electron discharge device 95 are powered due to the D.C. voltage provided by the rectifier comprising capacitance 120, diode 119 and transformer windings 118. Potentiometer 113 is set such that the electronic discharge device is highly biased at its control grid 98 and therefore is in a cut-off condition. At this time relay 122 in the anode circuit of tube 95 is not energized and the positions of relay switches 116 and 106 and the came operated switches 124, 126 and 108 are such that the came drive motor 123 and the awning motor control circuit are not energized. When light of sufficient intensity strikes the photoelectric tube 110, current is caused to flow in the photoelectric circuit in such a direction as to reduce the negative bias on control grid 98 of the electron discharge device. When this bias is reduced enough for anode current to flow, anode relay 122 is energized and causes armatures 104 and 130 of switches 106 and 116, respectively, to be connected to contacts 131 and 115.

As a result of the operation of switch 116, the bias on electron discharge device 95 is caused to be further reduced due to a change in control from potentiometer 113 to potentiometer 112. This reduction in bias tends to keep current flowing in the electron discharge device sufficient to hold relay 122 energized even though the light level on the photoelectric tube 110 is reduced as the awning comes down and shades the photoelectric tube. Adjustment of potentiometer 113 sets the light level required to pull the relay armature contacts 104 and 130 down and adjustment of potentiometer 112 sets the light level required for the relay to release. This latter action automatically switches the electron discharge device 95 back to a high bias condition, thereby again requiring a strong light for further circuit energization.

At the time anode relay 122 is energized by the strong light striking photoelectric tube 110, the cam drive motor 123 and the transformer 42 in the motor control unit 25 also are energized by the closure of contacts 104 and 131. As the cam drive motor 123 rotates, the cams driven thereby open and close their associated switches in the manner similar to that described in connection with the time clock embodiment.

Cam switch armature 108 is operated by its associated cam in such a manner that the contacts 91 and 108 open to stop the rotation of motor 123 and its cam shaft after one half cycle is completed. Cam switch armature 126 is operated by its associated cam in such a manner that during this one-half cycle of operation, the awning motor rotates in the desired direction, that is, to lower the awning. Cam switch armature 124 is driven by an adjustable cam and therefore serves to supply power to the awning motor for the necessary period of time, namely, the time required for the awning to reach its lower limiting position. When cam switch armature 108 disengages contact 91 at the end of the half cycle, cam drive motor 123 and transformer 42 of the motor control unit are de-energized. Thus the unit remains idle until the light level drops to the value preset by potentiometer 112 to cut off discharge device 95 and de-energizes relay 122. This causes relay switch armature 130 to release and engage contact 117 and relay armature 104 to release and engage contact 105. As a result of the latter action energizing power is applied once again to cam drive motor 123 which rotates the cams to operate the switches, thus repeating the cycle and causing the awning to be driven upwards to its upward limiting position.

If desired, a number of awnings may be operated by the motor control unit 25 of the instant invention. Figures 11 and 12 show the exterior of the manual multiple switching unit which may be utilized with the invention. Figure 11 shows a 4-position multiple switch 180 for enabling selection of the desired one of the awnings connected to the control unit.

Switch 180 may be of any type well known in the art whereby power may be selectively applied from a single source to any of a plurality of outputs. Figure 12 shows a rear view of the manual multiple switching mechanism whereby terminal panels 181, 182, 183 and 184 each may be connected to separate ones of the awning motors adapted to be energized from the power source by switch 180.

If further desired, it is an aspect of this invention for the multiple unit to be automatically controlled by the cam shaft of either the timer clock unit or the photoelectric unit as described heretofore. The operation of this circuit will be readily understood by those versed in the art but, briefly, a two awning control circuit, as shown in Figure 13, comprises a cam drive motor 185, which is adapted to operate ganged cam switch armatures 186 and 187, 188 and 189, and 190 and 191. The automatic control mechanism, which may be either the time clock or photoelectric tube devices previously described, operate control switches 200 and 201; the clock tabs operating the switches in the case of time clock control, and the discharge device anode relay operating the switches in the case of the photoelectric cell control.

Terminal panels 181 and 182 each have three terminals to which the power leads of each of the awning rotors are connected. One conductor 193 of the three conductor electrical cable 24 from the manual control unit is connected directly to a terminal on each of the panels 181 and 182. The other two conductors 194 and 195 are connected through certain ones of the cam switches to the other terminals of panels 181 and 182 such that the awning rotor connected to panel 182 first is energized by the automatic multiple awning control circuits and subsequently the awning motor connected to panel 181 is energized by the multiple control circuits.

Thus it is seen that conductor 194 is connected to cam switch armature 187 which at this point in the cam cycle is connected to cam switch contact 202 and to a terminal in panel 182. Conductor 195 is connected to cam switch armature 186 which at this point in the cam cycle is in electrical contact with cam switch contact 203 and to a terminal in panel 182. Therefore it will be appreciated that when cam drive motor 185 is energized due to the closing of switch 201 by the automatic control mechanism, power will be supplied over cable 24 from control housing 25 in the manner described heretofore to terminal panel 182 to energize the awning rotor connected thereto.

The cam angle of the first cam is such that cam switch armature 186 is held closed with contact 203 and cam switch armature 187 is held closed with contact 202 for a period of time sufficient to allow the awning to traverse its path of travel. Manifestly this is brought about by the rise of an adjustable cam of the type heretofore described to control armatures 186 and 187.

When this time period has elapsed and while the cam drive motor 185 still is rotating, armatures 186 and 187 drop into their cam slots to close a connection between armature 186 and contact 205, and between armature 187 and contact 204. Thus the power from control housing 25 is supplied over cable 24 to the terminals of panel 181, and therefrom to the rotor of the other awning to cause it to traverse its path of travel. This period of time is preset into the automatic control apparatus by selectively adjusting the sizes of the slots in a second adjustable cam, that is, the cam controlling switch armatures 188 and 189.

The third cam in the automatic multiple awning control apparatus of Figure 13 advantageously may be of the fixed angle type so that cam switch armatures 190 and 191 are held in contacting relation with switch contacts 210 and 208, respectively, during one half cycle of operation and are held in contacting relation with switch contacts 211 and 209, respectively, during the other half cycle of operation. These latter switches serve to energize cam drive motor 185 and the power transformer in control housing 25, and to determine the direction of rotation of the awning rotor, in the manner described above in relation to the single awning control systems of Figures 7 and 10.

Thus I have shown and described several systems whereby a remote manual awning control system may be adapted for automatic control at predesignated time intervals by means of either a time clock operated system or a photoelectric cell operated system. Further, I have shown that such automatic control systems may be utilized for selectively controlling the operation of a plurality of awnings in sequence at said predesignated time intervals. It will be appreciated that even with the use of the automatic control systems, the manual control still is operative to effectively control awning operation.

It will be understood by those skilled in the art that changes may be made in the construction and arrangement of the parts of the disclosed illustrative embodiments with-

I claim as my invention:

1. Automatic control means for determining the direction of rotation of a motor comprising a plurality of switches adapted to control the application of energizing current to said motor, switch actuating means operatively associated with said switches, means controlling the operation of said switch actuating means during predetermined periods of time comprising a light sensitive element, a discharge device, means for providing a bias potential for said discharge device, first adjustable means normally connected to said discharge device for applying a bias thereto whereby the discharge device is caused to conduct upon the sensing of light of given intensity as determined by said first adjustable means, second adjustable means for applying a different bias to said discharge device, relay switching means responsive to the conduction of said discharge device for applying power to said switch actuating means and for disconnecting said first adjustable means from said discharge device and subsequently applying a bias to said discharge device from said second adjustable means whereby said discharge device is maintained in conduction for a time period determined by the operation of said switch actuating means.

2. In an awning control system the combination of a light sensitive element, a normally non-conducting discharge device controlled thereby, a first source of bias potential normally connected to said discharge device, a second source of bias potential, first switch means responsive to the conduction of said discharge device when the intensity of the light sensed by said light sensitive element exceeds the level determined by said first source of bias potential for switching said second source of bias potential to said discharge device disconnecting said first source of bias potential therefrom, motor means having energizing power applied thereto in response to the operation of said first switch means and second switch means for deenergizing said motor means after the latter has rotated a predetermined angular distance in one direction, said discharge device being returned to the nonconducting condition when the intensity of the light sensed by said light sensitive element is less than the level determined by said second source of bias potential to cause said first switch means to reconnect said first source of bias potential to said discharge device and to disconnect said second source of bias potential therefrom and to cause said motor means to rotate in the opposite direction through said predetermined angular distance.

References Cited in the file of this patent

UNITED STATES PATENTS

| | | |
|---|---|---|
| 831,404 | Ball | Sept. 18, 1906 |
| 2,083,726 | Mason | June 15, 1937 |
| 2,111,009 | Smith | Mar. 15, 1938 |
| 2,192,144 | Miller | Feb. 27, 1940 |
| 2,220,769 | Lennox | Nov. 5, 1940 |
| 2,627,347 | Powers | Feb. 3, 1953 |
| 2,637,831 | Eachus | May 5, 1953 |
| 2,755,424 | Papitto | July 17, 1956 |
| 2,789,263 | Cohn | Apr. 16, 1957 |